United States Patent
Meynants

(10) Patent No.: US 11,726,185 B2
(45) Date of Patent: Aug. 15, 2023

(54) IMAGE SENSOR FOR DETERMINING A THREE-DIMENSIONAL IMAGE AND METHOD FOR DETERMINING A THREE-DIMENSIONAL IMAGE

(71) Applicant: ams International AG, Rapperswil (CH)

(72) Inventor: Guy Meynants, Rapperswil (CH)

(73) Assignee: AMS INTERNATIONAL AG, Rapperswil (CH)

( * ) Notice: Subject to any disclaimer, the term of this patent is extended or adjusted under 35 U.S.C. 154(b) by 470 days.

(21) Appl. No.: 16/757,542

(22) PCT Filed: Oct. 17, 2018

(86) PCT No.: PCT/EP2018/078406
§ 371 (c)(1),
(2) Date: Apr. 20, 2020

(87) PCT Pub. No.: WO2019/081301
PCT Pub. Date: May 2, 2019

(65) Prior Publication Data
US 2021/0223371 A1   Jul. 22, 2021

(30) Foreign Application Priority Data
Oct. 23, 2017   (EP) .................................... 17197809

(51) Int. Cl.
*G01S 7/4863*   (2020.01)
*G01S 17/894*   (2020.01)
*G01S 17/42*   (2006.01)

(52) U.S. Cl.
CPC ............ *G01S 7/4863* (2013.01); *G01S 17/42* (2013.01); *G01S 17/894* (2020.01)

(58) Field of Classification Search
CPC ....... G01S 7/4863; G01S 17/894; G01S 17/42
See application file for complete search history.

(56) References Cited

U.S. PATENT DOCUMENTS

| 6,825,455 B1 | 11/2004 | Schwarte |
| 2011/0129123 A1* | 6/2011 | Ovsiannikov ........... G01S 17/86 382/106 |

(Continued)

FOREIGN PATENT DOCUMENTS

| CN | 105763788 A | 7/2016 |
| DE | 19704496 | 3/1998 |

(Continued)

OTHER PUBLICATIONS

Seong-Jin, Kim et al.: "A CMOS Image Sensor Based on Unified Pixel Architecture With Time-Division Multiplexing Scheme for Color and Depth Image Acquisition" IEEE Journal of Solidstate Circuits, vol. 47, No. 11; Nov. 2012; p. 2834-2845, XP011470530, ISSN: 0018-9200, 001: 10.1109/JSSC.2012.221417.

(Continued)

*Primary Examiner* — Zaihan Jiang
(74) *Attorney, Agent, or Firm* — MH2 Technology Law Group LLP

(57) ABSTRACT

An image sensor arrangement for determining a three-dimensional image comprises an image sensor comprising an array of global shutter pixels and a control unit which is configured to drive the image sensor in an imaging mode and in a time-of-flight mode. In the imaging mode, the control unit drives the pixels according to an imaging timing sequence. In the time-of-flight mode, the control unit drives the pixels according to a time-of-flight, TOF, timing sequence. At least a first subset of pixels are operated with a phase delay with respect to at least a second subset of pixels according to a first phase and a second phase, respectively.

21 Claims, 8 Drawing Sheets

(56) References Cited

U.S. PATENT DOCUMENTS

| | | | | |
|---|---|---|---|---|
| 2012/0098964 A1* | 4/2012 | Oggier | ............... | H04N 13/204 |
| | | | | 348/140 |
| 2012/0185094 A1* | 7/2012 | Rosenstein | .......... | G05D 1/0272 |
| | | | | 901/1 |
| 2013/0226344 A1* | 8/2013 | Wong | ..................... | G05D 1/024 |
| | | | | 901/1 |
| 2016/0286108 A1 | 9/2016 | Fettig et al. | | |
| 2017/0026590 A1* | 1/2017 | Wang | .................. | H04N 25/134 |
| 2019/0293792 A1* | 9/2019 | Keel | ........................ | G01S 17/36 |
| 2020/0096614 A1* | 3/2020 | Amaya-Benitez | .... | G01S 7/4816 |

FOREIGN PATENT DOCUMENTS

| | | | |
|---|---|---|---|
| EP | 2830311 | * | 2/2014 |
| EP | 2738812 | | 6/2014 |
| EP | 2830311 | * | 6/2014 |
| EP | 2768024 | | 8/2014 |
| WO | 2016/105776 | | 6/2016 |

OTHER PUBLICATIONS

Van der Tempel, W. et al.: "Towards smarter ranging pixels with high dynamic range : sensitivity-tuning of current assisted photonic demodulators" International Image Sensor Workshop 2007 (available on www.imagesensors.org), p. 113-16.

European Patent Office, International Search Report for PCT/EP2018/078406 dated Oct. 12, 2018.

Tang, S., Chinese Examination Report issued in Chinese Application No. 201880068966.5 dated Feb. 23, 2023, with English language translation, 20 pages.

* cited by examiner

IMAGE SENSOR FOR DETERMINING A THREE-DIMENSIONAL IMAGE AND METHOD FOR DETERMINING A THREE-DIMENSIONAL IMAGE

CROSS-REFERENCE TO RELATED APPLICATIONS

The present application is the national stage entry of International Patent Application No. PCT/EP2018/078406, filed on Oct. 17, 2018, which claims the benefit of priority of European Patent Application No. 17197809.1, filed on Oct. 23, 2017, all of which are hereby incorporated by reference in their entirety for all purposes.

FIELD OF THE INVENTION

This invention relates to an image sensor and to a method for operating an image sensor to determine a three-dimensional image. For example, the image sensor and the method relate to time-of-flight 3D imaging capabilities.

BACKGROUND OF THE INVENTION

An image sensor can be considered a sensor that detects and conveys information that constitutes an image. Common image sensors record an image as a two-dimensional representation of an object. However, recent technological advances led to image sensors with time-of-flight capabilities that allow for three-dimensional imaging. Such devices record depth information in combination with a regular two-dimensional image. For example, depth information is determined by measuring a travel time of a light pulse emitted by a light source arranged close to the sensor. The time until the detection of the reflected light pulse by the image sensor is proportional to the distance of the reflecting object.

Most time-of-flight image sensors are dedicated devices which are optimized for recording time-of-flight information in their pixels. Direct and indirect time-of-flight systems are used. In direct time-of-flight systems, an arrival time of a light pulse is measured by a photodetector such as a SPAD and the time is converted to a signal. Measurements are repeated to improve the accuracy. In indirect time-of-flight systems, charges are collected and accumulated from a train of light pulses. Image sensors capable of time-of-flight recording are dedicated devices with specialized time-of-flight (TOF) pixels. Such TOF pixels are more complex and larger than pixels used in regular image sensors, and require optimized design of the pixel devices and layout of the pixels.

FIG. 10 shows an example of a prior art time-of-flight measurement concept. The schematic drawing shows an emitter EM, e.g. a LED or laser, and a time-of-flight camera ToFC comprising a time-of-flight image sensor. Typically, the camera also comprises a dedicated image sensor without time-of-flight image capabilities. Furthermore, a near object NO and another further away object FO are depicted.

The emitter EM emits a train of light pulses LP towards the objects NO, FO (shown as emitted light signal ELS in the drawing). Eventually light is reflected by any of the objects and traverses back to the time-of-flight camera ToFC. The drawing shows two reflected light signals RLS1, RLS2 which represent a typical detection signal for the near and far object, respectively. It can be seen that the reflected light signals RLS1, RLS2 are sifted in time relative to each other. This shift indicates an arrival time $t_d$ of reflected light pulses which is smaller for the near and larger for the far object. The arrival time $t_d$ is measured depending on a first and second pixel clock, denoted as phases Ø1 and Ø2 in the drawing. A shading in the light pulses of the reflected light signal indicates a reflection occurring during a time when the first pixel clock or first phase Ø1 is on and a reflection occurring during a time when the second pixel clock or second phase Ø2 is on. The shadings can be interpreted as an amount of electric charge detected during the phases Ø1 and Ø2 and detection signals $V_1$ and $V_2$ in response to the accumulated charge, respectively. The detection signals provide a means to determine the arrival time. Finally, a distance d to an object can be calculated using the speed of light c and a pulse duration $T_0$ and yields:

$$d = \frac{1}{2} c \cdot T_0 \cdot \frac{V_2}{V_1 + V_2}.$$

The pulse duration $T_0$ is in the range of 30 to 50 ns, for example.

The bottom part of the drawing in FIG. 10 depicts a schematic representation of a dedicated time-of-flight pixel. The pixel comprises a photodiode PD and at least two storage bins. These storage bins are used to collect incident light in specific time intervals which are determined by the first and second phases Ø1 and Ø2, respectively. FD1 and FD2 are the charge collecting bins for a two-phase indirect time-of-flight pixel.

FIG. 11 shows an example of a prior art indirect time-of-flight pixel. Usually two or four storage bins or charge collecting bins are used. With two bins, each bin collects charge at one phase of a TOF modulated signal, e.g. the reflected light signals RLS1, RLS2 of FIG. 10. Sometimes an extra storage bin is provided to record background signal information, and an extra transfer gate is provided to drain the photodiode PD when none of the storage bins is active. In FIG. 11 FD1 and FD2 are the charge collecting bins of a two-phase indirect time-of-flight pixel. FDb denotes a background signal bin which can be used to collect a background signal when no light source is activated, and interleaved with a TOF pulse acquisition process. A transfer gate FDd is used to drain charges in case when none of the three collecting bins, i.e. FD1, FD2 or FDb, is switched on to collect charge.

Phases Ø1 and Ø2 are pulsed alternatingly after a light pulse LP as shown in the timing scheme of FIG. 10. A phase Øb is pulsed to acquire a background signal at moments that the light source is not pulsed. Phase Ød is pulsed to drain away charges collected by the photodiode PD in case when none of the other bins is allowed to collect charge, i.e. when Ø1, Ø2 and Øb are all low. This results in a complex pixel with four transfer gates and considerable routing is required to drive all gates and read out all signals. In addition, image sensors for 3D imaging still rely on a regular pixel matrix which needs to provide a regular image and need to be complimented with an array of TOF pixels. The charge collecting bins FD1 and FD2 accumulate charges and detection signals $V_1$ and $V_2$ are generated in response to the accumulated charge. The detection signals $V_1$ and $V_2$ can be used to derive a distance information as shown by the equation above.

SUMMARY OF THE INVENTION

It is to be understood that any feature described hereinafter in relation to any one embodiment may be used alone, or in combination with other features described hereinafter, and may also be used in combination with one or more features of any other of the embodiments, or any combination of any other of the embodiments, unless explicitly described as an alternative. Furthermore, equivalents and modifications not described below may also be employed without departing from the scope of the image sensor and the method for determining a three-dimensional image as defined in the accompanying claims.

The following relates to an improved concept that allows to operate an image sensor, e.g. a global shutter image sensor, in two different operating modes: an imaging mode and a time-of-flight mode. For example, the imaging mode may involve a global shutter 2D image capture with standard pixel timing and in the time-of-flight mode some pixels capture one phase of a TOF light pulse, while other pixels capture another phase. Two or more phases may be used. A range distance signal, e.g. including accumulated pixel values, may then be generated by interpolating information from neighboring pixels. Some pixels may be used to capture background light, e.g. expose when the light source is not pulsed.

In some embodiments a global shutter CMOS image sensor can be used including an array of pixels. The pixels in the array can be operated with a global shutter signal with fast gating during the imaging mode. Fast gating occurs on a time scale of <100 ns, for example. In the time-of-flight mode a subset of pixels can be operated with a global shutter signal corresponding to a first timing sequence, while a second subset of pixels can be operated with a global shutter signal corresponding to a second timing sequence. Such an image sensor may also be capable to operate all pixels with the same global shutter signals in a further mode of operation.

In some embodiments a timing sequence in the time-of-flight mode may involve random repetition of pulses. A method of pulsing a time-of-flight light source (emitter) and synchronizing time-of-flight gates in the pixel with a non-repetitive pulse pattern is proposed to resolve the effects of false echoes or reflections of objects that are further away from the sensor.

In some embodiments calculating time-of-flight range information from the image sensor may involve spatial interpolation of the range data from the pixel array, e.g. pixel values of neighboring pixels. Spatial interpolation may involve interpolating information from neighboring pixels using an interpolation algorithm. Furthermore, a color filter interpolation algorithm based upon available distance information from the range sensing function can be used for optimization of a resulting depth image.

In at least one embodiment an image sensor arrangement for determining a three dimensional image comprises an image sensor. The image sensor comprises an array of global shutter pixels and a control unit which is configured to drive the image sensor in an imaging mode and in a time-of-flight mode. In the imaging mode, the control unit drives at least some of the pixels according to an imaging timing sequence. In the time-of-flight mode, the control unit drives at least some of the pixels according to a time-of-flight, TOF, timing sequence. At least the first subset of pixels is operated with a phase delay with respect to the at least one second subset of pixels according to first phase and second phase, respectively.

In other words, the same pixels can be driven in either mode by just changing the timing sequence, i.e. a given pixel can be operated in imaging mode or TOF mode. All pixels can use the same control signals. The timing of said control signals determines imaging timing sequence, the TOF timing sequence and phase delay. In the imaging mode the pixels may have no phase delay.

The term "at least some of" used above indicates that all or a subset of pixels can be driven by the control unit according to the imaging timing sequence and/or TOF timing sequence. A number of pixels operated in the TOF mode and a number of pixels operated in the imaging mode may not be the same. For example, the number of pixels operated in the TOF mode is smaller than the number of pixels operated in the imaging mode. For example, in time-of-flight mode the image sensor may drive a limited amount of pixels, e.g. a limited number or subset of rows, while in the imaging mode a full resolution image may be used by driving all pixels in the array according to the imaging timing sequence.

For example, the pixels can be operated with one or more global shutter pixels. Readout of the pixels results in a spatial 2D image for the imaging mode, and a depth information image for the time-of-flight mode. The depth information can be provided for each subset of pixels separately. The depth information image can be constructed from the depth information provided by the pixels of the subsets, for example. Furthermore, the depth information of a given subset of pixels can be interpolated using neighboring pixels. This way the depth information image can be prepared in a way that fits (in terms of resolution) to the spatial 2D image. Using the spatial 2D image and the depth information, e.g. the depth information image, from the same image sensor a final three-dimensional image can be constructed and comprises both two-dimensional and depth information.

In at least one embodiment all global shutter pixels can be operated in the imaging mode, i.e. can be driven by the control unit according to the imaging timing sequence. However, not all global shutter pixels can be operated in the TOF mode, i.e. can be driven by the control unit according to the TOF timing sequence. In an example array of 1280× 1024 pixels a number of 64 rows may be capable to be operated both in TOF mode and in imaging mode. In other words, the remaining rows or pixels may not be driven or may not be capable of being driven according to the TOF timing sequence. This can be achieved by means of the control unit which may simply not provide control signals, such as an emitter control signal, to all global shutter pixels except for those to be operated in the TOF mode. Alternatively, the remaining rows or pixels may not be implemented (in terms of hardware) to be driven according to the TOF timing sequence. For example, the remaining rows or pixels may have a different driver logic compared to pixels that can be operated in both imaging and TOF mode. Said different driver logic may as well be arranged for (global shutter) imaging mode with fast driving of the transfer gate signals, for example.

In at least one embodiment an image sensor arrangement for determining a three dimensional image comprises an image sensor. The image sensor comprises an array of global shutter pixels and a control unit which is configured to drive the image sensor in an imaging mode and in a time-of-flight mode.

In the imaging mode, the control unit drives at least some of the pixels according to an imaging timing sequence. In the time-of-flight mode, the control unit drives at least some of the pixels according to a time-of-flight, TOF, timing sequence. In the time-of-flight mode, pixels of at least a first subset of pixels are driven with a phase delay with respect to pixels of at least a second subset of pixels according to a first phase and a second phase. In the imaging mode, said first subset of pixels and said second subset of pixels are driven without phase delay.

In other words, the same pixels can be driven in either mode by just changing the timing sequence, i.e. a given pixel can be operated in imaging mode or TOF mode. All pixels can use the same control signals. The timing of said control signals determines imaging timing sequence, the TOF timing sequence and phase delay. In the imaging mode the pixels may have no phase delay.

In at least one embodiment the pixels of the array of global shutter pixels are configured to be operated in both the imaging mode and the time-of-flight mode depending on whether the pixels are driven according to the TOF timing sequence or the imaging timing sequence, respectively.

In at least one embodiment the pixels that are driven in the imaging mode are different from the pixels that are driven in the time-of-flight mode. For example, at least one or some rows (or columns) of pixels are driven in the time-of-flight mode while at least one or some different rows (or columns) of pixels are always driven in the imaging mode.

In at least one embodiment an emitter is configured to emit a plurality of light pulses in response to respective trigger pulses of an emitter control signal. In the time-of-flight mode, the control unit generates the emitter control signal. The phases are defined with respect to the trigger pulses of the control signal.

In at least one embodiment the imaging sensor comprises transfer lines which are connected to a driver logic. A first subset of transfer lines is coupled to pixels of the first subset by means of first control lines, respectively. For example, the control lines lead from a common transfer line to individual pixels. A second subset of transfer lines is coupled to pixels of the second subset by means of second control lines, respectively. The driver logic is connected to the control unit and is arranged to operate the pixels of the first subset according to the first phase and to operate the pixels of the second subset according to the second phase.

In at least one embodiment a third subset of transfer lines is coupled to pixels of a third subset by means of third control lines, respectively. In addition, or alternatively, a fourth subset of transfer lines is coupled to pixels of a fourth subset by means of fourth control lines, etc. The driver logic is arranged to operate the pixels of the third and/or the fourth subset etc. according to a third phase and a fourth phases etc., respectively.

In at least one embodiment the subsets of pixels are arranged in the array such that any given pixel is coupled to a subset of transfer lines, by means of respective control lines, such that said pixel has at least one neighboring pixel that is coupled to a different subset of transfer lines, by means of respective control lines. This way any pixel that is operated with a given phase has at least one neighboring pixel which is operated with another phase in the time-of-flight mode.

In at least one embodiment the pixels from a subset are connected to transfer lines by means of their connection lines such that pixels arranged in a common column of the array are operated according to a same phase. For example, all pixels of a same column are connected to the same transfer line, by means of respective control lines. Pixels from a neighboring same column are connected to a neighboring same transfer line, by means of respective control lines. Alternatively, pixels arranged in a common row of the array are operated according to a same phase. For example, all pixels of a same row are connected to the same transfer line, by means of respective control lines. Pixels from a neighboring same row are connected to a neighboring same transfer line, by means of respective control lines. Alternatively, at least some diagonally adjacent pixels from different columns or rows are operated with a same phase. For example, pixels from a given diagonal in the sensor array are, by means of respective control lines, connected to transfer lines of a same subset of transfer lines.

In at least one embodiment at least some pixels from the first, second, third and fourth subset are arranged in a matrix group such as a 2×2 matrix group. The pixels are connected to transfer lines by means of their connection lines such that each of the pixels arranged in the matrix group is operated with a different phase.

In at least one embodiment pixels of a same subset are connected to shared transfer lines and/or shared control lines. For example, adjacent pixels, such as pairs of adjacent pixels, are connected to the shared transfer lines and/or the shared control lines.

For example, such an arrangement allows for commonly driving pixels sharing a transfer line or control line. In some pixels, it is possible to drive an anti-blooming gate or transfer gate by the same control line for two neighboring pixels. In such case, it may be possible that two adjacent rows use one phase while the next two adjacent rows use another phase when the array is operated in the time-of-flight mode. Interpolation algorithms can be adjusted for such a configuration.

In at least one embodiment the image sensor comprises a plurality of micro-lenses. Two or more pixels are arranged under the same micro-lens, respectively.

For example, each of the pixels arranged under the same micro-lens can be driven with a different phase. For long distance applications, the time-of-flight mode provides sufficient accuracy. For closer distance, a phase detect auto focus can be used. The same micro-lens may cover two adjacent pixels, such as a 2×1 matrix group using two phases, or four neighboring pixels arranged in a 2×2 matrix group using two or four phases.

In at least one embodiment a method for determining a three-dimensional image involves an image sensor comprising an array of global shutter pixels. The method comprises driving the pixels of the image sensor in an imaging mode according to an imaging timing sequence. Furthermore, the pixels are driven in a time-of-flight mode according to a time-of-flight timing sequence. At least a first subset of pixels are operated with a phase delay with respect to at least a second subset of pixels according to a first phase and a second phase, respectively.

In at least one embodiment a method for determining a three-dimensional image involves an image sensor comprising an array of global shutter pixels. The method comprises driving the pixels of the image sensor in an imaging mode according to an imaging timing sequence and driving the pixels of the image sensor in a time-of-flight mode according to a time-of-flight, TOF, timing sequence. In the time-of-flight mode, pixels of at least a first subset of pixels are operated with a phase delay with respect to pixels of at least a second subset of pixels according to a first phase and a second phase. In the imaging mode, said first subset of pixels and said second subset of pixels are driven without phase delay.

In other words, the same pixels can be driven in either mode by just changing the timing sequence, i.e. a given pixel can be operated in imaging mode or TOF mode. All pixels can use the same control signals. The timing of said control signals determines imaging timing sequence, the TOF timing sequence and phase delay. In the imaging mode the pixels may have no phase delay.

In at least one embodiment the same pixels of the array of global shutter pixels are operated in the imaging mode and the time-of-flight mode depending on whether the pixels are driven according to the TOF timing sequence or the imaging timing sequence, respectively.

In at least one embodiment an emitter control signal is generated. A plurality of light pulses is emitted by an emitter in response to respective trigger pulses of the emitter control signal. The phases are defined with respect to the trigger pulses of the emitter control signal.

In at least one embodiment the trigger pulses of the emitter control signal occur in a non-periodical pattern. Each trigger pulse has a rectangular pulse waveform and a constant pulse duration. However, the trigger pulses are not repeated with a constant but rather with a random time period. The random time period can be implemented by programmable random delays between consecutive trigger pulses, for example. This way aliasing artifacts like false echoes can be reduced.

In at least one embodiment the trigger pulses of the emitter control signal occur in a periodical pattern. Each trigger pulse has a rectangular pulse waveform and a constant pulse duration. The trigger pulses are repeated with a constant time period.

In an alternative embodiment the trigger pulses may also have non-constant pulse durations, which may also be programmable.

In at least one embodiment the time-of-flight mode comprises at least two phases. Pixels which are arranged in a common column of the array are operated according to a same phase. Alternatively, pixels which are arranged in a common column of the array are operated according to a same phase.

Alternatively, at least some diagonally adjacent pixels from different columns or rows are operated with a same phase.

In at least one embodiment the time-of-flight mode comprises at least three phases, or four phases. At least some pixels are arranged in 2×2 matrix groups. At least three pixels, or alternatively four pixels, arranged in a given 2×2 matrix group are operated with different phases, respectively.

In at least one embodiment the pixels are read out in a readout mode. In the readout mode pixel values accumulated during the imaging mode are used to construct a two-dimensional image. Pixel values accumulated during the time-of-flight mode are used to construct a depth information image. Finally, the two dimensional image and the depth information image are combined into a three-dimensional image.

In at least one embodiment the readout mode pixel values accumulated during the time-of-flight mode are used to construct the depth information image for each subset of pixels separately. Alternatively, the separate depth information images for each subset of pixels are combined into a combined depth information image. The combined depth information image and the two-dimensional image can then be combined into the three-dimensional image.

In at least one embodiment the separate depth information image of a given subset of pixels is interpolated for pixels or pixel locations of the other subsets using an interpolation algorithm and/or a color interpolation algorithm.

Further implementations of the method are readily derived from the various implementations and embodiments of the sensor arrangement and vice versa.

The proposed concept allows to add time-of-flight functionality to an image sensor such as a global shutter CMOS image sensor. In some cases that may even be possible without modifications to the readout circuitry and with no or very small changes to the pixel array. Pixel array driving circuits may be adapted. This can be done without significantly increasing the area of the imaging device.

The image sensor can be operated in an imaging mode such as a global shutter image capture mode, or in a time-of-flight mode. This allows for a cost-effective 3D camera system, as the same image sensor and camera (incl. lens) can be used to record depth information and a visible spatial 2D image. It also makes it much easier to map image information such as color or RGB data to the depth information. With a dedicated range cameras of the prior art, however, there may be a displacement between image and ToF sensor or even two separate cameras for imaging and ToF. This is not the case with the proposed concept.

Global shutter pixels can be made small because they do not contain as much devices as needed for standard time-of-flight pixels. Because the pixels are small, no extra measures are needed to ensure a fast collection of carriers. In prior art time-of-flight pixels, however, large photodiodes are used which require specific measures in design to accelerate the charge collection process. In turn, a slow collection process increases timing uncertainty on the collected charges. This limits the accuracy of the calculated range signal. And this limits the maximum possible modulation frequency. For short range time-of-flight sensing, higher modulation frequencies may be needed. The proposed concept can offer higher frequencies, and can hence be optimized to shorter range depth sensing, if needed by the application.

Since the pixels can be small, several pixels can be arranged with shared micro-lenses, light waveguides, or backside illumination achieve a good light sensitivity. Such techniques are often not commonly available on large pixels. Furthermore, the proposed concept can work at lower power consumption than structures using larger pixel sizes with photogates and large photodiodes, or structures using direct time-of-flight with SPAD photodetectors. Less total gate capacitance area needs to be pulsed when compared with other indirect time-of-flight solutions. This results in lower power consumption for the same modulation frequency. Compared to direct time-of-flight, no fast clocked high power time-to-digital conversion circuit may be required.

The concept can be applied to provide faster and better autofocus capabilities to a camera. For example, the image sensor can be operated first in the time-of-flight mode to generate a depth information image or map which can be used for autofocus. A focus distance of a camera lens can be adjusted using the depth information map and a normal spatial 2D image can be acquired with optimized focus conditions.

In time-of-flight mode, the distance information can be calculated from pixels of different subsets, e.g. two adjacent pixels. For example, the pixel information of 2×1 (or 2×2) matrix of adjacent pixels can be used to calculate depth information and reduce the resolution of the depth map to one half or a fourth of the resolution compared to full resolution available during the imaging mode. However, because the global shutter pixels can be made really small (like 3 µm pitch), still a high resolution can be achieved for the range image. (e.g. 4 Mega Pixel, MP, image resolution and 2 or 1 MP range information resolution).

Phase information can be interpolated from neighboring pixels in a way similar to techniques used for color filter interpolation. This way a higher resolution depth information map can be generated. Interpolation errors may, however, occur at positions with large contrasts but similar filtering techniques can be used as for color filter array, CFA, interpolation. For small pixels, the optical diffraction limits of the optics tend to avoid such errors by the low-pass filter characteristics of the optics. For larger pixels an anti-aliasing filter can be used, e.g. similar to the ones used on digital cameras to avoid color aliasing or moiré effects.

Interpolation offers a higher effective resolution. It is also possible to optimize the color filter interpolation based upon the distance information achieved by the pixels. For example, if two adjacent pixels result in the same distance or depth information, it may be assumed that their color is similar. If two adjacent pixels show difference in distance which is larger than a predetermined threshold value, it can also be expected that the pixels show different objects and that these objects have different colors. In this sense, the distance or depth information gives additional information for the color filter interpolation process, which can be used to further enhance the interpolation algorithm, and hence the image quality.

A spread spectrum of light pulsing can be used to avoid false distance information from objects reflected at a double distance. This may become important at high modulation frequencies and short distance range applications that are also enabled by the proposed concept.

In the following, the principle presented above is described in further detail with respect to drawings, in which example embodiments are presented.

In the embodiments and Figures below, similar or identical elements may each be provided with the same reference numerals. The elements illustrated in the drawings and their size relationships among one another, however, should not be regarded as true to scale. Rather individual elements, such as layers, components, and regions, may be exaggerated to enable better illustration or improved understanding.

DETAILED DESCRIPTION

Figure 1:
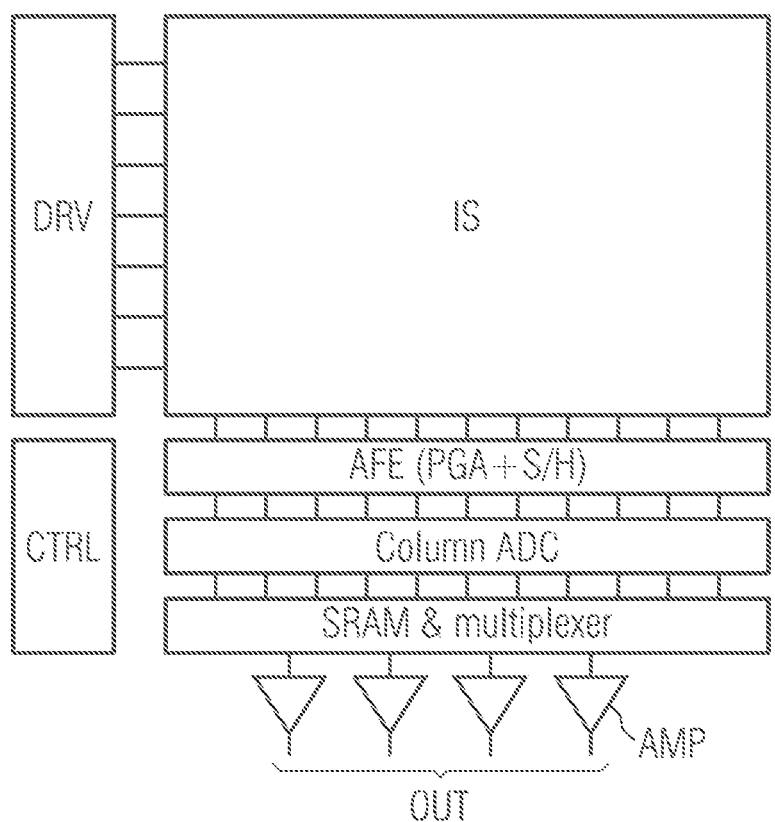
FIG. 1 shows an embodiment of an image sensor arrangement for determining a three-dimensional image according to the proposed concept.

FIG. 1 shows an embodiment of an image sensor arrangement for determining a three-dimensional image according to the proposed concept. The drawing shows an image sensor IS, a control unit CTRL, a driver logic DRV and output stages OUT related to readout and pre-processing.

The image sensor IS comprises an array of photosensitive picture elements, referred to as pixels hereinafter. The pixels in this embodiment are global shutter CMOS image sensor pixels, or global shutter pixels for short, i.e. the pixels of the image sensor IS may capture an image at the same moment in time. Further details of the pixels and their structure are discussed below with respect to FIG. 3.

The control unit CTRL controls operation of the image sensor IS, the driver logic DRV and the output stages OUT. The control involves timing of the pixels in the array, e.g. in an imaging mode IM and in a time-of-flight mode TM according to an imaging timing sequence and according to a time-of-flight, TOF, timing sequence, respectively. The control unit CTRL determines timing, exposure and bias of the individual pixels in the array, for example.

In more detail, the control unit CTRL comprises means, such as a dedicated logic or a microcontroller, for controlling exposure of pixels, timing sequences and bias of individual pixels or groups of pixels in the array. The control unit CTRL can control resetting of the pixels to control the start of an exposure period (e.g. including operation of transfer gates and reset via a control signal), operation of transfer gates to transfer charges to a charge storage node and/or floating diffusion fd, operation of switches by means of a control signal to control read-out from a pixel.

The driver logic DRV is connected to the control unit CTRL and the image sensor IS. The driver logic DRV is arranged to control readout of pixels in the image sensor IS. For example, the driver logic DRV comprises line driver circuitry for generating control signals on transfer and/or control lines. Furthermore, the driver logic DRV can have row selection/line driver circuitry for generating control signals on the transfer and/or control lines to control readout of pixels.

Example timing schemes for control signals will be discussed below. For example, the pixel array can be read out with pixels being scanned on a row-by-row basis or the control unit CTRL can perform a global shutter function by synchronizing operation of control signals which control respective exposure times of each of the pixels of the array. The control unit CTRL can be implemented in a hard-coded form, such as in an Application Specific Integrated Circuit, ASIC, or as reconfigurable processing apparatus such as a logic array (programmable array, reconfigurable array) or a general-purpose processor or a microcontroller which executes control software.

The output stages OUT comprise column processing circuitry dedicated to each column, such as an analog-to-digital converter ADC, one or more amplifiers, and storage means to store values in order to perform features such as correlated double sampling CDS. Furthermore, the image sensor can be connected to a configurable analog frontend with a programmable gain amplifier PGA and a sample and hold circuit S/H. An output stage can perform further processing of the signals received from columns of the array. Further components such as memory elements, such as SRAM, and multiplexers are implemented to facilitate read-out of the image sensor IS. All or some of the elements shown in FIG. 1 can be provided on a single semiconductor device or the elements can be distributed among several separate devices.

Compared to a regular 2D image sensor, the proposed image sensor arrangement may only differ in some of the following features. First, the driver logic DRV, e.g. row logic, column logic or any other configuration as discussed before, is capable to drive alternating columns, rows or individual pixels with different phases. Second, the driver logic DRV is able to drive transfer gate signal lines and charge drain control lines at high speed. In many time-of-flight applications frequencies of up to few 10 MHz may be required, e.g. 20 MHz or 50 MHz modulation frequency. Both measures do not take much extra area. Power consumption can be more optimal than several other ToF implementations because only the transfer gates are driven. For small pixels, these gates can be quite small, which reduces the capacitance to drive.

Figure 2:
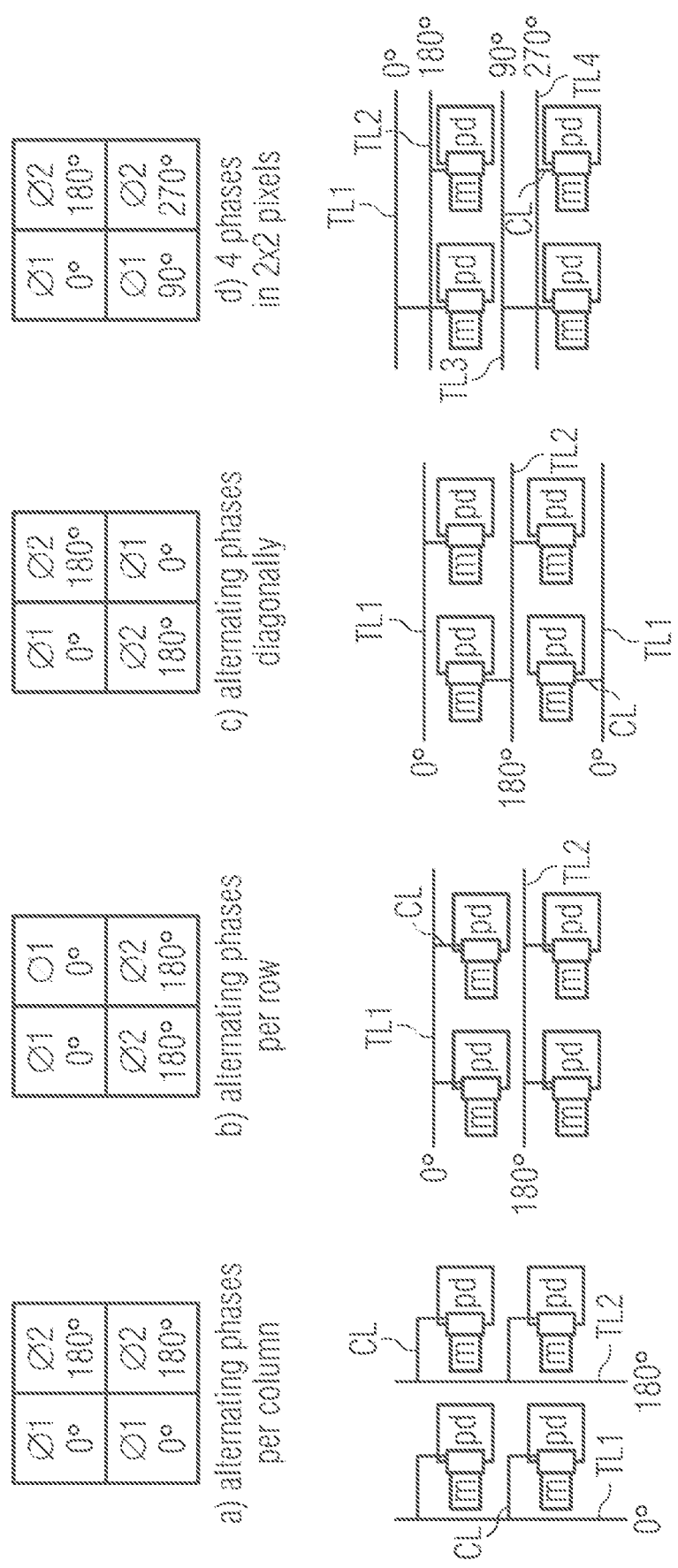
FIG. 2 shows embodiments of pixel subsets for a time-of-flight mode according to the proposed concept.

FIG. 2 shows embodiments of pixel subsets for a time-of-flight mode according to the proposed concept. Pixels of imaging sensor IS are arranged in a two dimensional, 2D, pixel array matrix of rows and columns. Individual pixels are connected to respective transfer gate signal lines by means of control lines, respectively. The transfer gate signal lines, denoted transfer lines hereinafter, are arranged along the columns or rows, respectively, and are connected to the driver logic DRV. In the embodiments discussed hereinafter the terms row and column are interchangeable unless mentioned otherwise.

The transfer lines are grouped into different subsets. Transfer lines TL1 to TL4 of a given subset are connected to individual pixels by means of control lines CL, and thereby group the pixels into corresponding subsets as well. Pixels of the same subset are operated with a same phase, whereas pixels from different subsets are operated with a different phase.

The drawing of FIG. 2 shows example schemes to connect pixels to transfer lines and thereby determine a distribution of time-of-flight phases over the pixels. The drawing shows pixels arranged in a 2×2 matrix group which can be considered representative for the whole or at least part of image sensor IS. The examples shown in the drawing include a) alternating phases per column, b) alternating phases per row, c) diagonally alternating phases, and d) four phases in the 2×2 pixel matrix group. Each pixel in the drawing is represented by its photodiode PD; m denotes a memory node in the pixel where a signal of accumulated pulses can be stored (such as gate Øm in FIG. 3). An (anti blooming) charge drain gate AB is connected to an opposite signal with similar interconnect principles (not shown). Different phases are denoted as 0°, 90°, 180°, and 270°, for example.

In example a) pixels in the same column are driven with the same phase, e.g. the first phase Ø1 or 0° or a second phase Ø2 or 180°. The lower part of the drawing shows a possible implementation with a first transfer line TL1 connected to the driver logic DRV at a first terminal, e.g. a first phase driver, and a second transfer line TL2 connected to the driver logic DRV at a second terminal. In the time-of-flight mode TM, odd and even columns can be driven by two different phases, i.e. Ø1 or 0° or a second phase Ø2 or 180°. Distance information can be reconstructed with half resolution along a row (in the horizontal direction). There is one distance data point per 2×1 pixels. A transfer signal can be issued as control signal by the control unit CTRL and the driver logic DRV can be routed vertically over the pixel array.

Similarly, in example b) pixels in the same row are driven with the same phase, e.g. the first phase Ø1 or 0° or a second phase Ø2 or 180°. The lower part of the drawing shows a possible implementation similar to example a) with rows connected instead of columns. This example is essentially equivalent to example a). However, instead odd and even rows are driven by two different phases. The transfer signal issued as control signal by the control unit CTRL is routed horizontally over the pixel array.

In example c) transfer lines TL1, TL2 are arranged horizontally, i.e. along rows of the pixel array. Neighboring pixels, however, are connected via their control lines CL to transfer lines of different subsets. Thus, in the 2×2 matrix group depicted in the drawing diagonally adjacent pixels use different phases, e.g. the first phase Ø1 or 0° or a second phase Ø2 or 180°. Horizontal or vertical transfer signal routing can be used. The control lines CL which are connected to the transfer lines TL1, TL2 alternate in the pixels as shown in the drawing.

In a color sensor the individual pixels can be equipped with dedicated filters, such as in a Bayer matrix or the like. Consider a 2×2 Bayer matrix group of four pixels arranged as [RGGB] with a red pixel R, two green pixels G and one blue pixel B. A connection pattern of transfer and control lines could then involve three different subsets of transfer lines such that the green pixels can be used with the same phases etc. For example, in each Bayer matrix the red pixel R, the two green pixels G and the blue pixel B are connected to a first, second and third transfer line TL1, TL2, and TL3, respectively. This way the red pixel R, the two green pixels G and the blue pixel B are driven by different phases, e.g. a first phase Ø1 or 0°, a second phase Ø2 or 120°, and a third phase Ø3 or 240°.

However, the two green pixels G could also be driven with two different phases such that all pixels in a color matrix group, such as the Bayer matrix, are connected to different transfer lines TL1 to TL4, respectively. This improves avoiding errors at colored objects. In a Bayer [RGGB] matrix, this means that the image is reconstructed at a fourth of the resolution (one range data point per 2×2 pixels). The diagonal structure of example c) or example d) can be used as a configuration for a color matrix group such as a Bayer matrix. Color matrix groups other than Bayer matrix can be used as well, e.g. a [CYGM] matrix (Cyan, Yellow, Green, and Magenta) or a [RGBW] matrix (from Red, Green, Blue, and White).

Example d) shows a four phase system comprising transfer lines TL1, to TL4 of four different subsets. Each of the four pixels in the 2×2 matrix is connected to a different transfer line and thereby use different phases (0°, 90°, 180°, and) 270°. This embodiment can also be used for color or monochrome applications.

In some embodiments, pixels can be connected to the same transfer lines and/or control lines between two adjacent pixels. For example, an anti-blooming gate AB or a transfer gate Øt may be driven by the same transfer line for two neighboring pixels. In such case, it may be possible that two adjacent rows use one phase (e.g. 0°) while the next two rows use another phase (e.g. 180°) when the array is operated in the time-of-flight mode. Interpolation algorithms can be adjusted for such a configuration to increase resolution.

As shown in the various examples in FIG. 2, different pixels of the pixel array are operated with different phases and contribute to a final time-of-flight depth signal. In each pixel, the information of the other TOF phases is not determined and, thus, need to be determined by neighboring pixels or be calculated, e.g. in order to extract the full distance information in each pixel. Several approaches can be followed.

An interpolation algorithm similar to a color filter interpolation can be used. For example the Hamilton-Adams algorithm (as described e.g. in U.S. Pat. No. 5,652,621) can be adapted as will be discussed in the following. In this algorithm, first gradients are calculated for intensity changes for pixels of the same color, and then the data is interpolated amongst an axis where the change of data is minimal. The idea is that in this case, both pixels can be assumed to represent the same object and, thus, have the same color. One can then also consider that a change in distance is not large neither. This means that interpolation along the direction in the image where the gradient is minimal, can also be used for distance interpolation.

This means that in a first phase, for interpolation of a pixel at a certain location, the gradients are calculated in horizontal and vertical and, optionally, diagonal direction from neighboring pixels, or from pixels with the same phase information. Then the direction of the lowest gradient value is selected and the missing phase information is interpolated along that direction. This can be repeated for different directions, e.g. 0°, 90°, 180° and 270° direction in case of a four-phase TOF system. For a two-phase TOF system two directions can be used, e.g. 0° and 180°, and only one phase needs to be interpolated and the calculation can be simplified.

Other color filter reconstruction algorithms rely on low-pass filtering of chrominance information (e.g. U.S. Pat. No. 6,833,868). Such algorithms may be less useful for 3D TOF interpolation. These algorithms rely on the human vision system which has less spatial resolution on chrominance than on luminance. For distance information this may not be relevant.

Furthermore, classification algorithms can be used on the visible image that can also be acquired by the same image sensor and the same pixels during the imaging mode IM. Image object classification can be feature based, color based, based upon contours in the image, watershed algorithms or other algorithms known in the art. After classification, distance or time-of-flight phase information can be interpolated in each pixel using information from the same objects in the classification. This assumes that there is no sudden distance change in an object as classified in the scene.

In some timing sequences, some of the rows of the array may collect depth (time-of-flight) signals and other rows collect the background image (w/o time-of-flight pulses). Similar to the earlier described methods using various interpolation algorithms, the background image information can be used for classification or for estimation of the, if preferred, (lowest gradient) interpolation direction. Another alternative is to calculate a lower resolution depth map. For example, information of four pixels (for example arranged in a 2×2 matrix group of pixels) is combined to one depth pixel. At some positions in the image, one or some of these pixels may be representing a different object.

Figure 3:
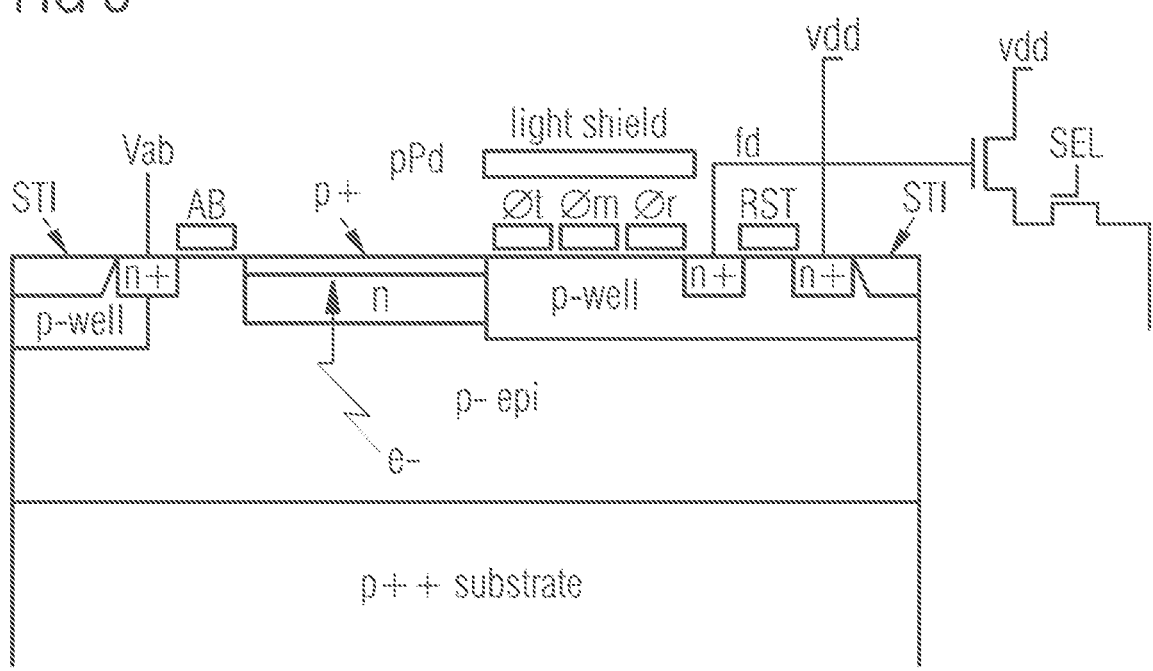
FIG. 3 shows an embodiment of a pixel of an image sensor according to the proposed concept.

FIG. 3 shows an embodiment of a pixel of an image sensor according to the proposed concept. The drawing relates to a global shutter pixel which is used in a 2D pixel array matrix of the image sensor IS. The structure of the global shutter pixel has already been introduced in EP 2768024 A1 which is hereby introduced by reference.

The drawing depicts a cross-section of a single global shutter pixel and represents the pixels in the array. The pixel comprises a p-type epitaxial layer, denoted p-epi, a p-well region, a pinned photodiode formed by a p+ surface implant and a deeper n implant, an n+ implant region, and a p++ substrate. The n+ and p+ implant regions are isolated also by shallow trench isolation STI. The photodiode PD is a pinned photodiode in which the surface is pinned at ground potential by the p+ surface implant layer. This p+ implant layer is connected to the ground potential (not shown in the drawing). The diode itself is formed by the deeper n-type implant n under this pinning implant, which forms a junction with the p+ surface implant and the p-epitaxial layer p-epi. A source follower and select transistor SEL are shown on circuit level only.

As shown in the cross-section in FIG. 3, the photodiode PD comprises charge transfer gates: a transfer gate øt, a memory gate øm and a reset gate ør, as well as a floating diffusion fd, a reset transistor RST, and an anti-blooming charge drain AB. The pixel comprises an in-pixel charge storage m under a storage or memory gate øm. An optional light shield LS can be used to shield the charge transfer gates from incident light.

The pixel can be used in both the imaging mode IM and in the time-of-flight mode TM. Operation of the pixel in the imaging mode and in the time-of-flight mode will be discussed with greater detail below. Basically, charges can be transferred from the photodiode PD to the storage gate øm via the transfer gate øt at the end of an exposure time. For readout, the floating diffusion fd is reset through reset transistor RST using the reset gate ør, such that the charge is transferred from the charge transfer gate øm to the floating diffusion fd by pulsing the charge transfer gate ør. After a signal has been sampled and stored under gate øm a next image can be acquired.

Photo-generated electrons are created in the substrate. The electrons e− generated in the p-epitaxial layer p-epi can be collected by the photodiode PD. Some electrons, however, are generated inside the depleted area of the photodiode PD and, thus, can be immediately collected. Other charges may be generated outside of the depletion area and will diffuse until they eventually reach the electric field formed by the photodiode or by another junction or gate in the structure.

Figure 4:
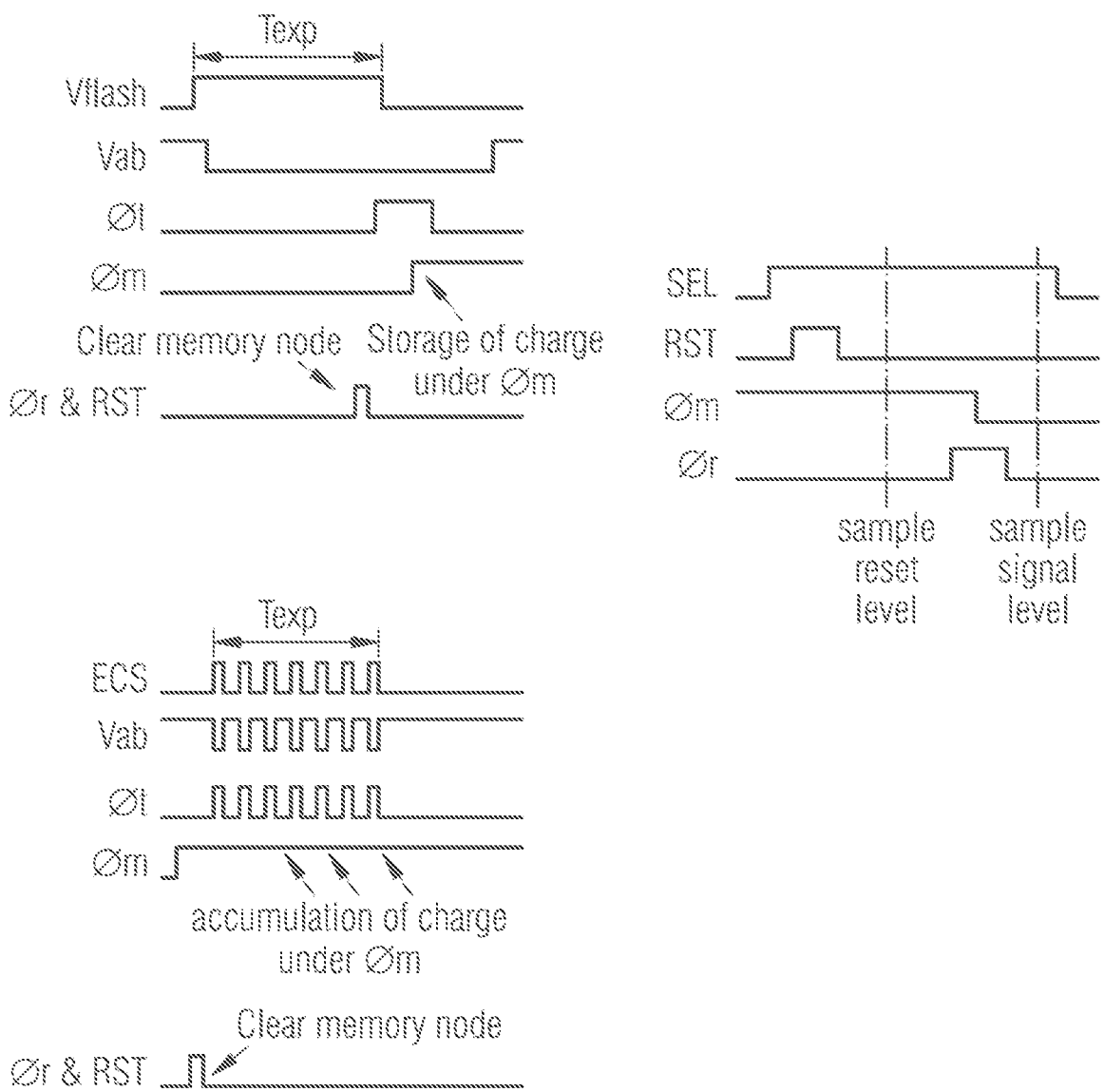
FIG. 4 shows example timing sequences according to the proposed concept.

FIG. 4 shows example timing sequences according to the proposed concept. The image sensor can be operated in the imaging mode IM and in the time-of-flight mode TM as discussed above. An example pixel readout mode RM is shown in the drawing as well.

The imaging mode IM includes a global shutter timing sequence to operate a pixel as shown in FIG. 3. The global shutter timing sequence can be applied to all pixels in the image sensor or only to part of pixels, e.g. in a defined region of interest, ROI. In this embodiment the global shutter timing sequence involves the following steps.

Before start of an exposure the photodiode PD is drained by the anti-blooming charge drain gate AB. As an exposure is initiated the charge drain gate AB goes low, i.e. an anti-blooming voltage Vab applied to the charge drain gate AB goes to a low voltage value. During an exposure, charges are collected using the photodiode PD. Optionally, a light source, such as a LED flash, can be switched on for a duration Texp (e.g. a total exposure time) to serve as a flash or an auxiliary light source. This is indicated by voltage Vflash in the drawing. The light source may be implemented together with the image sensor IS in the same device, such as a camera or mobile device. Alternatively, a vertical anti-blooming structure can be used as commonly known in the art from interline transfer CCD devices. Then the photodiode can be emptied by a pulse to the substrate that evacuates charge present in the photodiode.

At the end of the exposure, the accumulated charge is moved from the photodiode PD to the memory node m under gate Øm. This is done by applying a pulsed control signal on the charge transfer gate Øt. The memory charge transfer gate Øm is pulsed after transfer gate Øt to store the accumulated charge in memory node m. The memory charge transfer gate Øm may be held at a low voltage or high voltage during the exposure and might have contained charge from the previous exposure during part of a following exposure. Additionally, the memory node m located under memory charge transfer gate Øm may be drained just before charge transfer is initiated by applying the pulsed control signal on the charge transfer gate Øt. This can be accomplished with a global reset of the memory node m by pulsing a reset control signal at the reset transistor RST and at the reset charge transfer gate Ør, e.g. to a high voltage value in all pixels of the array.

In the readout mode RM, the memory node m is read row-by-row, for example. In this embodiment a readout timing sequence involves the following steps. An individual pixel is selected for readout by means of select transistor SEL. The floating diffusion fd is reset by applying the reset control signal at reset transistor RST. The voltage at the memory charge transfer gate Øm is sampled as a reset level. Then the charge stored in the memory area m is transferred to the floating diffusion fd by pulsing the reset gate Ør (using the reset control signal) and the memory gate Øm. In some variants of the readout timing application of anti-blooming or acquisition of dark current can be included if needed.

In this embodiment, the time-of-flight mode TM includes a time-of-flight, TOF, timing sequence which involves the following steps. In the time-of-flight mode, a ToF emitter EM, such as a fast LED or VCSEL, is used together with the image sensor IS. The emitter EM is configured to emit a plurality of light pulses in response to respective trigger pulses of an emitter control signal ECS. In the time-of-flight mode TM, the control unit CTRL generates the emitter control signal. The emitter control signal ECS can be used to set a time standard to define two or more phases Ø1, Ø2, etc. For example the phases can be defined with a time delay with respect to the trigger pulses of the emitter control signal ECS.

The emitter control signal ECS comprises a pulse train and, in turn, the emitter EM creates a set of light pulses. These emitted light pulses eventually are reflected by an external object and traverse back to the image sensor IS. The reflected light pulses are collected by the pixels which can be operated with fast gating of the charge transfer gates Øt, Øm, and Ør as discussed above. For example, in each pixel used in the time-of-flight mode TM, the transfer gate Øt is pulsed using a control signal with the same pulse train as the emitter, i.e. according to the emitter control signal ECS but with a predetermined delay or phase shift. The anti-blooming gate AB is pulsed with the anti-blooming voltage which resembles the inverted signal of the transfer gate Øt. During the exposure time Texp charges are induced in the pixel and collected in the memory node m when the signal applied to the transfer gate Øt is high. Charges accumulate in the memory node m during the consecutive pulses. During accumulation a control signal at the memory charge transfer gate Øm is in high state as well.

After exposure, i.e. when the exposure time Texp has lapsed, a time-of-flight signal has been accumulated and is stored in the memory node under memory gate Øm. In order to initiate a next measurement cycle, i.e. a ToF timing sequence, the memory node m should be cleared before a new pulse train of the emitter control signal ECS is started. This can be accomplished with a global reset of all pixels used for the time-flight mode, e.g. by reset of their memory node m by pulsing the reset control signal at the reset transistor RST and at the reset charge transfer gate Ør, e.g. to a high voltage value in all pixels of the array. For readout the same readout mode RM can be used.

In an embodiment (not shown) instead of a memory gate Øm a virtual gate can be used. Such a virtual gate can be implemented by a set of implants, for example a p+ surface implant and a deeper n-type implant similar as the pinned photodiode shown in FIG. 3, but with a higher pinning potential. It can also be made through a combination of an implant and an extended Øt transfer gate, as has been described in EP 2768024, for example, which is hereby incorporated by reference.

Although the timing of the anti-blooming gate AB using the anti-blooming voltage Vab is shown to be inverted with respect to the pulsed control signal of the transfer gate Øt, a variant may be used where there is no overlap between both signals, or where there is a dedicated time shift between the rising and falling edges of both signals. This may further improve the time gating properties of the pixels in the image sensor.

The proposed image sensor IS has a twofold signal acquisition scheme. In the imaging mode IM the pixels sample two dimensional information which is read out during the readout mode RM to yield a two dimensional image. In the time-of-flight mode TM pixels from the same image sensor sample two dimensional depth information which is read out during the readout mode to yield a depth information image. The pixels are operated according to the timing sequences discussed in FIG. 4. However, due to the arrangement of pixels into subsets, as discussed in FIG. 2, different pixels can be operated with different phases. For example, a first subset of pixels is operated according to a first phase and a second subset of pixels is operated according to a second phase. In other words, the timing sequences are executed according to different starting times which are defined by a phase delay between the phases, e.g. the first and the second phase. The depth information can be determined from the resulting depth images generated by the respective subsets of pixels, e.g. by combining partial depth images of the subsets into one final depth images or by interpolating partial depth images according to an interpolation algorithm. Finally, the two dimensional image and the depth image can be combined into a three-dimensional image.

Figure 5:
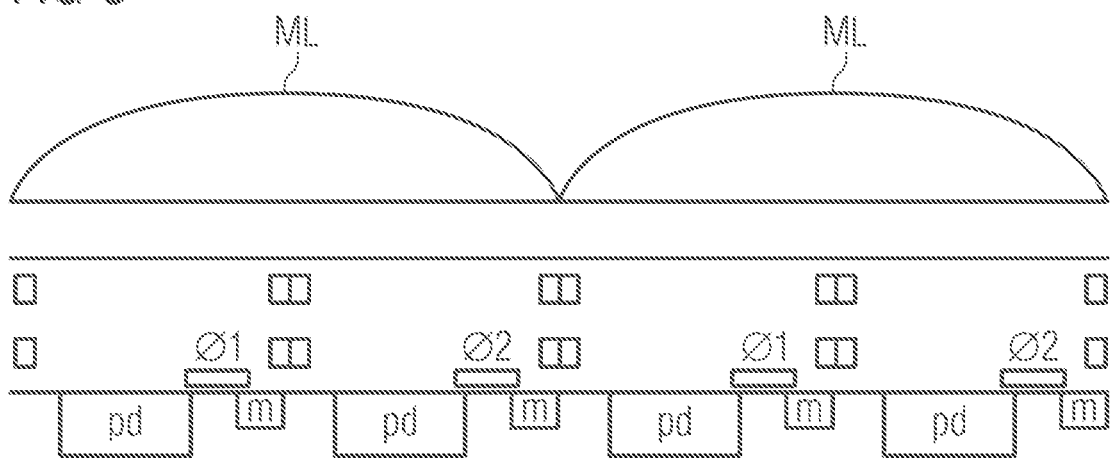
FIG. 5 shows an embodiment of an image sensor arrangement with a micro-lens structure according to the proposed concept.

FIG. 5 shows an embodiment of an image sensor arrangement with a micro-lens structure according to the proposed concept. The drawing shows a cross section of a column or row of the pixel array, e.g. four pixels. The pixels are represented by their photodiodes PD and m denotes the memory node in the pixel where a signal of accumulated pulses can be stored (such as charge transferred by memory gate Øm in FIG. 3 or 4). Furthermore, transfer lines are depicted which are coupled to the driver logic DRV to receive transfer signals according to the first phase Ø1 (e.g. 0°) or the second phase Ø2 (e.g. 180°). A micro-lens ML may cover 2×1 matrix group of pixels. It may cover a 2×2 matrix group of pixels where four or two phases are used as discussed with respect to FIG. 2. The micro-lens may have different optical shape, e.g. spherical or cylindrical lens shape.

For a device optimized for range sensing, or for lower resolution image capture, a pixel can be considered where 2×1 or 2×2 pixels are located under the same micro-lens. Each of the pixels under that micro-lens is driven with a different phase. For long distance, time-of-flight provides sufficient accuracy. For closer distance, also phase detect auto focus can be used.

Figure 6:
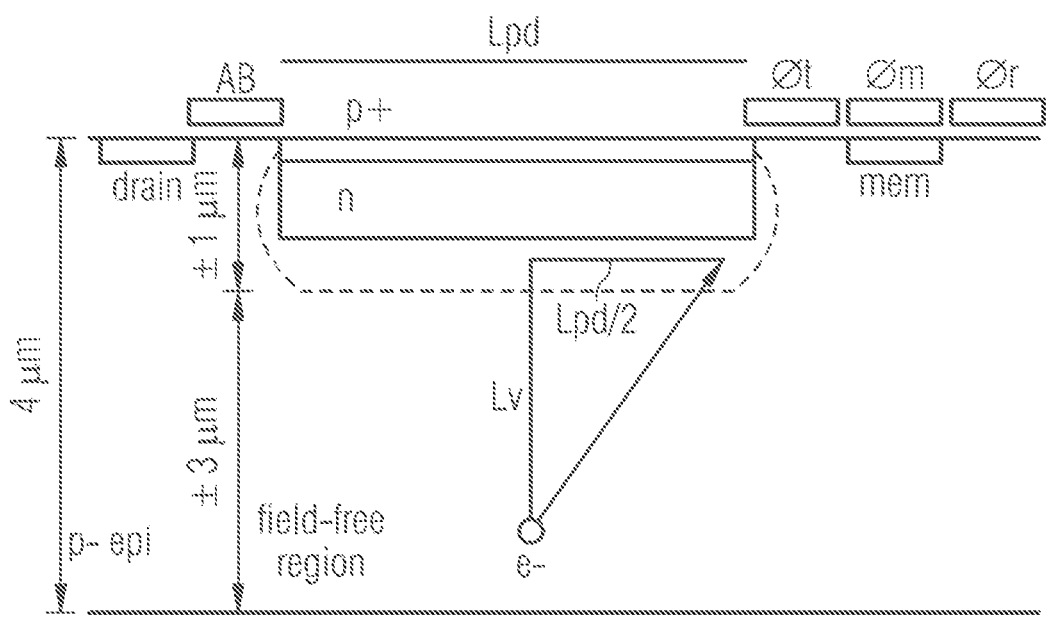
FIG. 6 shows an embodiment of a pixel of an image sensor according to the proposed concept.

FIG. 6 shows an embodiment of a pixel of an image sensor according to the proposed concept. In fact, the drawing shows a detail of the pixel discussed above with respect to FIG. 3.

For a time-of-flight pixel, it can be more critical that a charge induced by incident light is collected quickly after it is generated in the substrate. The collection is typically determined by a charge drift under large electric fields and by diffusion in small fields. For large pixels, diffusion of charges is a slow process as the charge needs to diffuse over several micrometers of distance. Diffusion times easily reach >10 ns in a photodiode of ~10 µm. For small pixels, however, with photodiode dimensions in the range of 1 to 2 µm, two effects support fast collection: 1) short diffusion distance, and 2) fringing of electric fields from the transfer gate and charge drain gate. Fringing fields create a drift component that accelerates the collection of charges. It plays a larger role in small pixels than in large pixels.

The role of the diffusion distance can be seen as follows. A time Δt needed to collect a charge when diffusion over a distance L can be calculated as follows:

$$\Delta t = \frac{L^2}{6 \cdot D},$$

where D is the diffusion constant given by Einstein's relation:

$$D = \mu \cdot \frac{k_B T}{q_{el}}.$$

Here µ denotes the carrier mobility, $q_{el}$ the elementary charge, $k_B$ Boltzman's constant, and T absolute temperature.

These two equations can be used to estimate that an electron e⁻ in a silicon substrate diffuses in 44 ps over 1 µm and in 1.11 ns over 5 µm, and in 4.4 ns over 10 µm. A smaller structure is thus desirable to reach short collection times. The dimensions of the proposed pixel structure are indicated in the drawing. For example, a length of the photodiode PD, denoted Lpd, is about 5 µm, a depth about 1 µm. An overall depth of the pixel is about 4 µm, wherein a field free region has a depth of 3 µm, for example.

If collection times are too long, then charge which is supposed to be collected during phase Ø1 or Ø2 may not be collected and be drained to the charge drain, e.g. via anti-blooming gate AB. In pixels with two gates such as in FIG. 3, the charge eventually will be collected by the wrong charge collection bin. In both cases, this reduces the modulation contrast and reduces the capability to accurately measure the distance.

FIG. 6 shows the diffusion route (indicated by the arrow) for charges e⁻ generated deep in the silicon substrate, e.g. in the field free region. To reach small collection times, the photodiode PD and charge transfer gates øt, øm and or are tuned by techniques such as: 1) deep depletion regions for the photodiodes. This can avoid that the diffusion process of charges from the bulk towards the depleted photodiode; and 2) use of shallow junctions and shallow collection volumes. Charges generated deeper in the silicon can be drained away rather than collected after a long diffusion process; and 3) vertical electric fields, e.g. by a gradation of dopant concentration of the epitaxial layer. One can also guide the light optically to an area close to the transfer gate, so that most charge does not have to diffuse too long to the floating diffusion by use of micro-lenses and/or light pipes on top of the photodetector.

Figure 7:
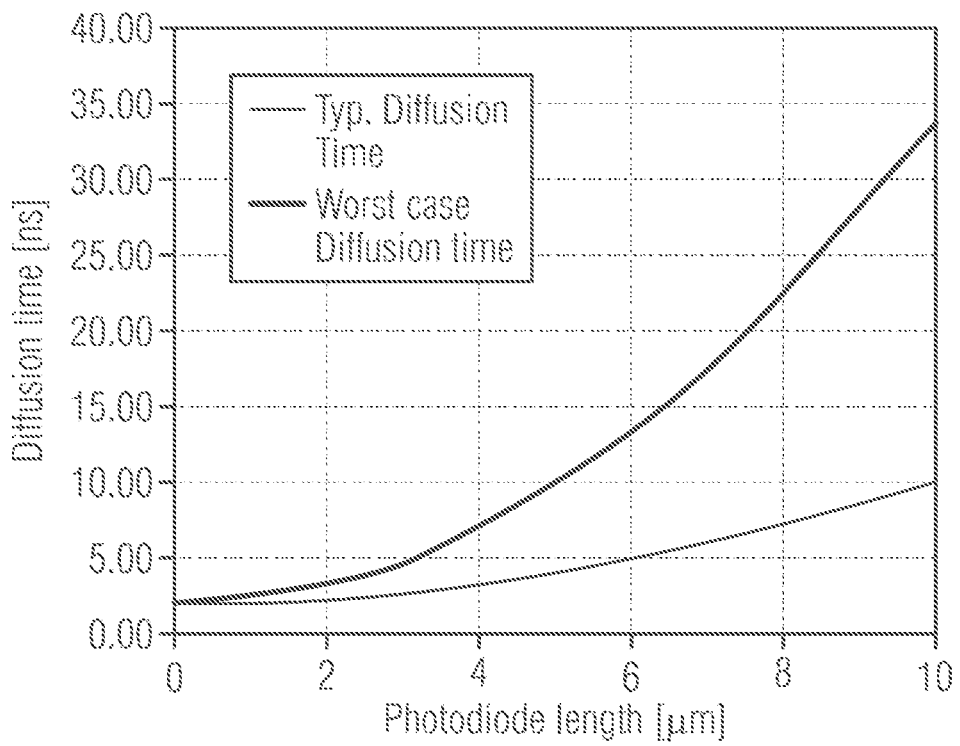
FIG. 7 shows an example of diffusion time for charges generated in the structure of FIG. 6 as a function of the dimension of the photodiode.

FIG. 7 shows an example of diffusion time for charges generated in the structure of FIG. 7 as a function of the dimension of the photodiode, e.g. a length Lpd of the photodiode. The width of the vertical field free region in this chart, denoted Lv, is set to 2.5 µm. The 'typical diffusion time' curve shows the time it takes for a charge carrier that is generated in the middle of the photodiode at a position of Lv (2.5 µm) to the memory node. The 'worst case diffusion time' curve shows the time it takes for a carrier that is generated at the opposite side of the transfer gate, at a depth Lv. This carrier has the longest distance to travel and will arrive latest at the memory node when the transfer gate is active. It is clear that not only the charge diffusion times are considerably smaller at small photodiode dimensions but also the spread in diffusion time with the location on where the carrier is generated is less variable.

The proposed concept takes advantage of the fact that global shutter pixels can be made very small today with pitches around 2.5 to 3.5 µm. This means that the photodiodes have become small (e.g. 1 to 2 µm) and charge collection times have decreased drastically. This also means that the diffusion times will be more closely distributed. The charge carrier generation process is a random process that can occur at any location in the photodiode. It can also occur at a depth or near the surface, as the charge generation process has an exponential decay from the surface onwards. For near infrared light, NIR, light penetrates rather deep into the substrate and a considerable amount of charges is generated deeper in the substrate. As the carriers are more or less randomly generated in the volume in the photodiode, the diffusion time will vary randomly. The spread on the diffusion time depends on the volume.

In photodiode used here as an example photodiode dimensions are near 1 to 1.5 µm in a 2.5 to 3.0 µm pixel pitch global shutter pixel. Charges are collected in a volume of 3 to 4 µm deep. A worst case diffusion distance is then about 5 µm. This would correspond to a diffusion time near 1 ns. This makes it possible to clock the gates at high frequencies, like 50 MHz, without too much loss in modulation contrast. 1 ns is 5% of the period of a typical time-of-flight pulse, TOF, such that a drop less than 5% of the modulation contrast can be expected at this modulation frequency. That is not possible with larger pixel structures, or pixel structures using large gates.

Figure 8:
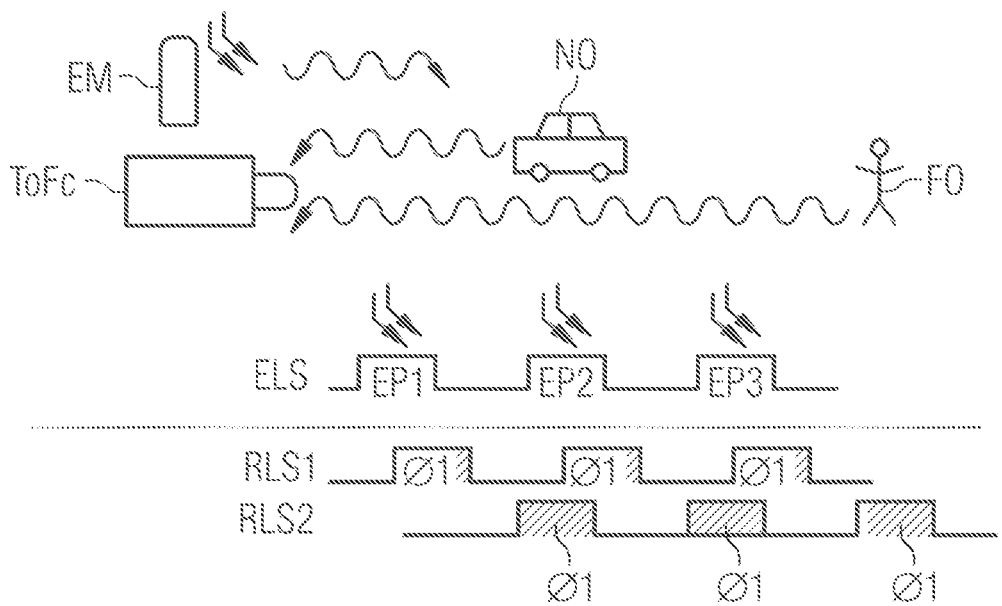
FIG. 8 shows an example of a time-of-flight measurement concept using the proposed image sensor.
Figure 10:
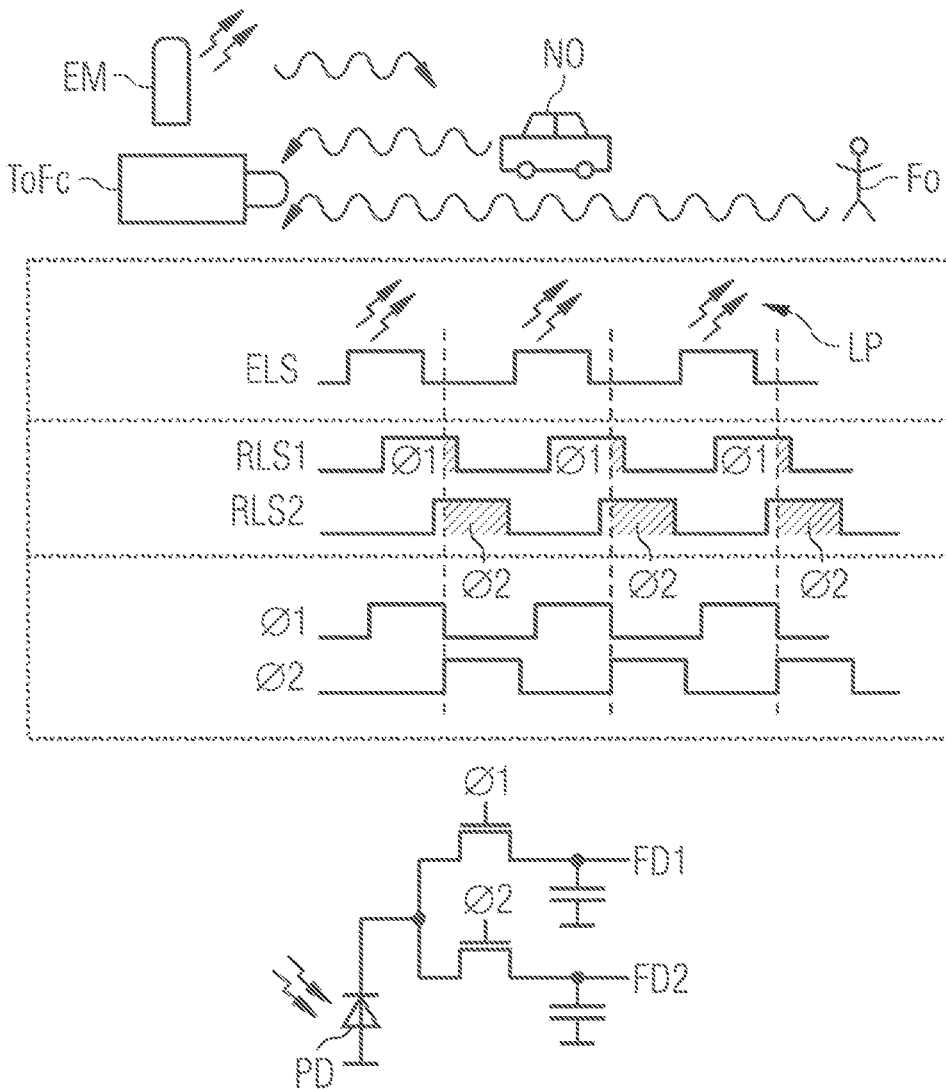
FIG. 10 shows an example of a prior art time-of-flight measurement concept.
Figure 11:
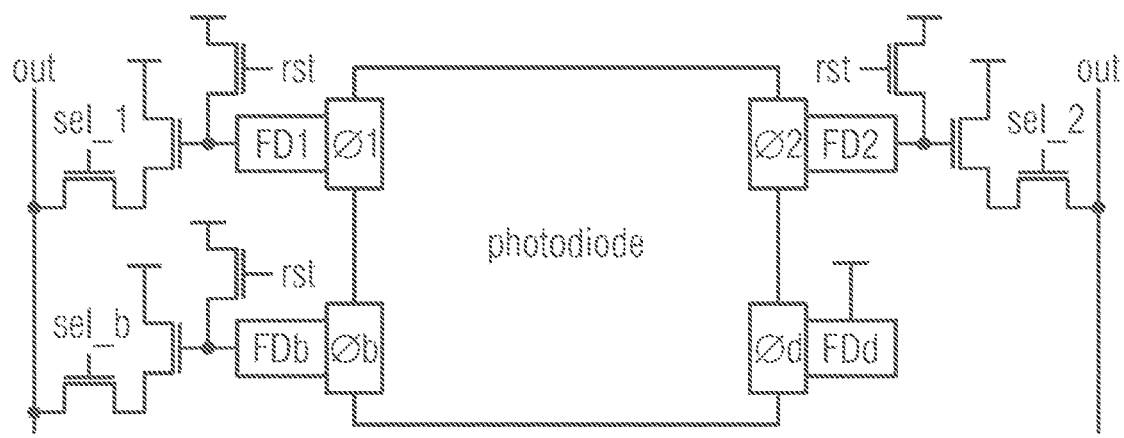
FIG. 11 shows an example of a prior art indirect time-of-flight pixel.

FIG. 8 shows an example of a time-of-flight measurement concept using the proposed image sensor. The schematic drawing is similar to FIG. 10 and shows an emitter EM, e.g. a LED or laser, and a time-of-flight camera ToFC comprising a time-of-flight image sensor according to the proposed concept. Furthermore, a near object NO and another further away object FO are depicted.

As described above, the proposed concept allows to increase the pulse frequency of the TOF trigger pulses of an emitter control signal. A fast pulse train, however, may create a problem when the further away object FO is far away from the sensor. The emitter EM emits a train of light pulses LP in response to respective trigger pulses which are emitted towards the objects NO, FO (shown as emitted light signal ELS in the drawing). The individual trigger pulses in that train of pulses occur in a regular or periodical pattern. For example, each trigger pulse the emitted light signal ELS too has a rectangular pulse waveform and a constant pulse duration r. The pulses are repeated with a constant period T.

Furthermore, the emitter control signal defines a time reference for the pixel clocks, e.g. a first and second pixel clock, denoted as phases Ø1 and Ø2. For example, the first phase Ø1 starts with a first time shift with respect to a respective trigger pulse. The second phase Ø2 starts with a second time shift with respect to a respective trigger pulse. Typically, pixel clocks or phase also comprise pulses that occur in a regular or periodical pattern. For example, each clock pulse too has a rectangular pulse waveform and a constant pulse duration r. The clock pulses are repeated with a constant period T. In some embodiments the period T and the pulse duration r are the same for the emitter control signal, the emitted light signal ELS and the pixels clocks, i.e. phases.

Eventually, emitted light pulses are reflected by any of the objects, traverse back to the time-of-flight camera and get detected as received light pulses. The drawing shows two reflected light signals RLS1, RLS2 which represent a typical detection signal for the near and far object, respectively. Basically, the reflected light signals RLS1, RLS2 resemble the regular or periodical pattern of the emitted light signal ELS. For example, the drawing shows that the reflected light signals RLS1, RLS2 are shifted in time relative to each other, according to the first and second pixel clocks, i.e. phases Ø1 and Ø2.

The shift indicates an arrival time $t_d$ of reflected light pulses which is smaller for the near and larger for the far object. The shading in the light pulses of the reflected light signal indicate a reflection occurring during a time when the first pixel clock or first phase Ø1 is on and a reflection occurring during a time when the second pixel clock or second phase Ø2 is on. Similarly, the shading indicate an amount of charge being detected by a pixel operated according to the first pixel clock or first phase Ø1 and indicate an amount of charge being detected by a pixel operated according to the second pixel clock or second phase Ø2.

The further away object FO may be placed at a distance such that a given reflections are only received by the camera at an instant when a reflection of a next reflected pulse from the near object NO is received. Reflected pulses from the near and further away object may overlap. This may create a mix of the echo of the close object NO and the further away object FO. Such an aliasing effect, referred to as false echo, may lead to artifacts in the depth information image. Also multi-path reflections may contribute to such artifacts in the depth information image. Multi-path reflections occur when light reflected from an object undergoes a second reflection, for example at a wall at the side of the scene. The light reflected through such trajectory has a later arrival time than light that is reflected directly towards the time-of-flight image sensor.

Figure 9:
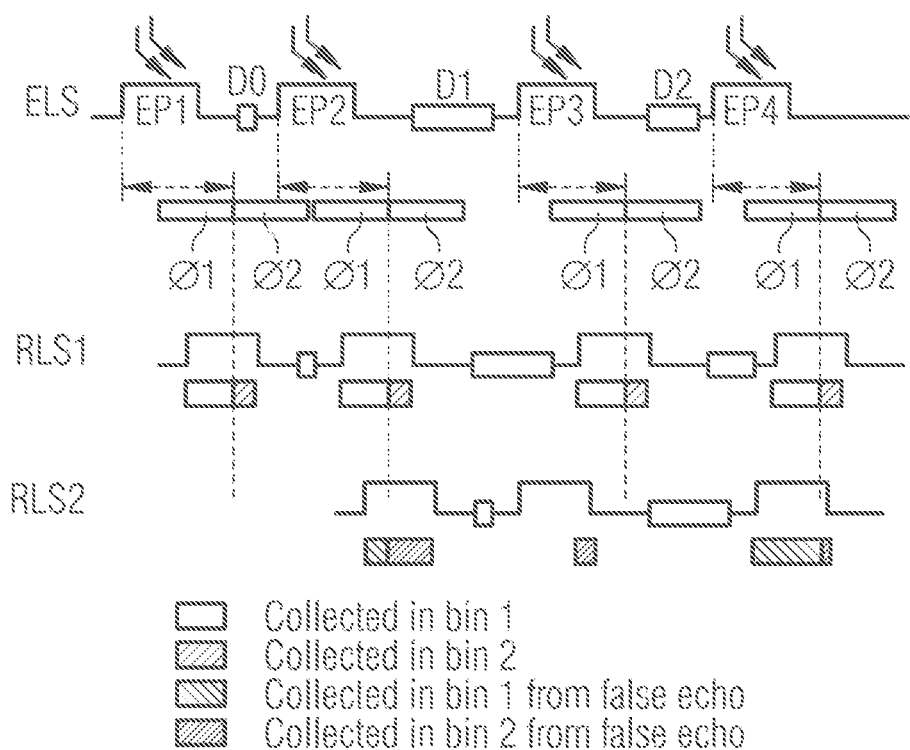
FIG. 9 shows another example of a time-of-flight measurement concept using the proposed image sensor.

FIG. 9 shows another example of a time-of-flight measurement concept using the proposed image sensor. One way to decrease aliasing effects, e.g. due to false echoes, is to create irregular time intervals with random delays between pulses of the emitted light signal ELS. This way false echoes of faraway objects can be spread over the charge bins randomly. This also spreads the response of multi-path reflection of objects.

As described above, the TOF trigger pulses of an emitter control signal cause the emitter EM to emit a train of light pulses LP in response. The individual trigger pulses in that train of pulses can occur in a non-regular or non-periodical pattern. For example, for each trigger pulse the emitted light signal ELS has a rectangular pulse waveform and a constant pulse duration r. However, the pulses may not be repeated with a constant but random period T.

Furthermore, the clock pulses or phases are repeated in a random fashion, e.g. in a random fashion determined by the random time period of the trigger pulses. The emitter control signal defines a time reference for the pixel clocks, e.g. a first and second pixel clock or phases Ø1 and Ø2. For example, the first phase Ø1 starts with a first time shift with respect to a respective trigger pulse. The second phase Ø2 starts with a second time shift with respect to a respective trigger pulse. In this embodiment the second phase Ø2 starts when the first phase has ended.

The random period T of the trigger pulses can be implemented with random delays (see random delays D0, D1, and D2 in the drawing). For example, the control unit CTRL can be complemented to comprise a programmable delay unit that is fed with a reference clock signal which may have a fixed clock period. The control unit CTRL is adapted to program a delay of the delay unit. In this way the control unit can generate the emitter control signal from the reference clock signal with a varied period T. For example, the control unit may be configured to program the delay unit for a variation of time periods between the subsequent trigger pulses based on control values provided by an up/down counter, a pseudorandom period generator, or by a lookup table. The period T of the emitter control signal, i.e. the time periods between the trigger pulses can be increased or decreased step-by-step, selected randomly or according to a predefined sequence stored in the lookup table.

For example, the delay unit is implemented as a programmable delay line being configured to output the control signal with the sequence of trigger pulses, based on the reference clock signal.

The control unit may be configured to program the delay line or the delay unit with a different delay time for successional clock pulses of the reference clock signal.

The drawing illustrates a pulse train of emitted light pulses having five consecutive rectangular pulses EP1 to EP5 with constant pulse duration (generated in response to respective trigger pulses of the emitter control signal). Random delays D0, D1, and D2 are depicted between each of the consecutive pulses. Each emitted light pulse is followed by a pulse of the first pixel clock or phase Ø1 which starts with the first time shift with respect to a respective trigger pulse. Said pulse of phase Ø1 is followed by a pulse of the second pixel clock or phase Ø2. A next pair including pulses of the first and second phases only follows after a next pulse is emitted according to the respective random delay, e.g. D0, D1, or D2.

The drawing also shows two reflected light signals RLS1, RLS2 which represent detection signals for the near and far object, respectively. The reflected light signal RLS1 for the near object shows a constant amount of charge collected by pixels operated with the first phase Ø1 and a constant amount of charge collected by pixels operated with the second phase Ø2. These amounts are indicated by the different shadings depicted below the received pulses of the reflected light signal RLS1.

The reflected light signal RLS2 for the further away object, however, does not show a constant ratio of detected amounts of charges. Instead an amount of charges collected by pixels operated with the first phase Ø1 differs depending on the random delays implemented in the emitter control signal. In as similar way an amount of charges collected by pixels operated with the second phase Ø2 differs depending on the random delays implemented in the emitter control signal. A constant amount of charge collected by pixels operated with the second phase Ø2. These amounts are indicated by the different shadings depicted below the received pulses of the reflected light signal RLS1.

The amounts of charges detected in the corresponding phases can be monitored. For example, ratios can be determined and compared with each other as the pulse train proceeds. Constant amounts or constant ratios are an indication that an object resides within a measurement range of the image sensor. Changes such as random changes of amounts or ratios are an indication that an object resides outside the measurement range of the image sensor and may contribute to aliasing. Thus, the detected amounts of charges provide a means to detect false echoes and prevent artifacts in the depth information.

The invention claimed is:

1. An image sensor arrangement for determining a three-dimensional image, comprising:
    an image sensor comprising an array of global shutter pixels,
    a control unit configured to drive the image sensor in an imaging mode and in a time-of-flight mode;
    wherein:
    in the imaging mode, the control unit drives at least some of the pixels according to an imaging timing sequence, such that a two-dimensional image is obtained after a readout of the driven pixels,
    in the time-of-flight mode, the control unit drives at least some of the pixels according to a time-of-flight, TOF, timing sequence, such that a depth image is obtained after a readout of the driven pixels, and
    the global shutter pixels are configured to be operated in both the imaging mode and the TOF mode.

2. The image sensor arrangement according to claim 1, wherein:
    in the time-of-flight mode, at least the first subset of pixels is driven with the phase delay with respect to at least the second subset of pixels according to the first phase and the second phase, and
    in the imaging mode, said first subset of pixels and said second subset of pixels are driven without the phase delay.

3. The image sensor arrangement according to claim 1, wherein the pixels of the array of global shutter pixels are configured to be operated in both the imaging mode and the time-of-flight mode depending on whether the pixels are driven according to the TOF timing sequence or the imaging timing sequence, respectively.

4. The image sensor arrangement according to claim 1, further comprising:
    an emitter configured to emit a plurality of light pulses in response to respective trigger pulses of an emitter control signal; wherein
    in the time-of-flight mode, the control unit generates the emitter control signal and
    the phases are defined with respect to the trigger pulses of the emitter control signal.

5. The image sensor arrangement according to claim 1, wherein
    the imaging sensor comprises transfer lines connected to a driver logic,
    a first subset of transfer lines are coupled to pixels of the first subset by means of first control lines, respectively,
    a second subset of transfer lines are coupled to pixels of the second subset by means of second control lines, respectively, and
    the driver logic is connected to the control unit to operate the pixels of the first subset according to the first phase and to operate the pixels of the second subset according to the second phase.

6. The image sensor arrangement according to claim 5, further comprising:
    a third subset of transfer lines are coupled to pixels of a third subset by means of third control lines, respectively, and/or
    a fourth subset of transfer lines are coupled to pixels of a fourth subset by means of fourth control lines, respectively, and
    the driver logic is arranged to operate the pixels of the third and/or the fourth subset according to a third phase and a fourth phase.

7. The image sensor arrangement according to claim 5, wherein the subsets of pixels are arranged in the array such that any given pixel coupled to a subset of transfer lines by means of a respective control line has at least one neighboring pixel that is coupled to a different subset of transfer lines by means of a respective control line.

8. The image sensor arrangement according to claim 7, wherein the pixels from a subset are connected to transfer lines by means of their connection lines such that:
    pixels arranged in a common column of the array are operated according to a same phase, or
    pixels arranged in a common column of the array are operated according to a same phase, or
    at least some diagonally adjacent pixels from different columns or rows are operated with a same phase.

9. The image sensor arrangement according to claim 7, wherein
    at least some pixels from the first, second, third and fourth subset are arranged in 2×2 matrix groups and
    are connected to transfer lines by means of their connection lines such that the pixels arranged in a 2×2 matrix group are operated with different phases.

10. The image sensor arrangement according to claim 7, wherein pixels of a same subset are connected to shared transfer lines and/or shared control lines, or between two adjacent pixels.

11. The image sensor arrangement according to claim 1, wherein
    the image sensor comprises a plurality of micro-lenses, and
    two or more pixels are arranged under a same micro-lens, respectively.

12. A method for determining a three-dimensional image, comprising an image sensor comprising an array of global shutter pixels, the method comprising the steps of:
    driving the pixels of the image sensor in an imaging mode according to an imaging timing sequence, such that a two-dimensional image is obtained after a readout of the driven pixels,
    driving the pixels of the image sensor in a time-of-flight mode according to a time-of-flight, TOF, timing sequence, such that a depth image is obtained after a readout of the driven pixels,
    wherein:
    the global shutter pixels are configured to be operated in both the imaging mode and the TOF mode.

13. The method according to claim 12, wherein:
    in the time-of-flight mode, at least the first subset of pixels is operated with the phase delay with respect to at least the second subset of pixels according to the first phase and the second phase, and in the imaging mode, said first subset of pixels and said second subset of pixels are driven without the phase delay.

14. The method according to claim 12, wherein the same pixels of the array of global shutter pixels are operated in the imaging mode and the time-of-flight mode depending on whether the pixels are driven according to the TOF timing sequence or the imaging timing sequence, respectively.

15. The method according to claim 12, wherein in the time-of-flight mode
an emitter control signal is generated,
a plurality of light pulses is emitted by an emitter in response to respective trigger pulses of the emitter control signal; and
the phases are defined with respect to the trigger pulses of the emitter control signal.

16. The method according to claim 15, wherein
the trigger pulses of the emitter control signal occur in a non-periodical pattern, wherein each trigger pulse has a rectangular pulse waveform and a constant pulse duration, and wherein the trigger pulses are not repeated with a constant but random period, or
the trigger pulses of the emitter control signal occur in a periodical pattern, wherein each trigger pulse has a rectangular pulse waveform and a constant pulse duration, and wherein the trigger pulses are repeated with a constant period.

17. The method according to claim 12, wherein the time-of-flight mode comprises at least two-phases such that
pixels arranged in a common column of the array are operated according to a same phase, or
pixels arranged in a common column of the array are operated according to a same phase, or
at least some diagonally adjacent pixels from different columns or rows are operated with a same phase.

18. The method according to claim 12, wherein
the time-of-flight mode comprises at least three phases, or four phases, such that:
at least some pixels are arranged in 2×2 matrix groups, and
at least three pixels, or four pixels, in a 2×2 matrix group are operated with different phases, respectively.

19. The method according to claim 12, wherein the pixels are readout in a readout mode such that
pixel values accumulated during the imaging mode are used to construct a two-dimensional image,
pixel values accumulated during the time-of-flight mode are used to construct a depth information image, and
the two-dimensional image and the depth information image are combined into a three-dimensional image.

20. The method according to claim 19, wherein the readout mode of pixel values accumulated during the time-of-flight mode
are used to construct a depth information image for each subset of pixels separately or
the separate depth information images for each subset of pixels are combined into a combined depth information image.

21. The method according to claim 20, wherein the separate depth information image of a given subsets of pixels is interpolated for pixels of other subsets using an interpolation algorithm and/or a color interpolation algorithm.

* * * * *